(12) United States Patent
Pyun et al.

(10) Patent No.: US 10,924,176 B2
(45) Date of Patent: Feb. 16, 2021

(54) NEXT GENERATION IN-BUILDING RELAY SYSTEM AND METHOD

(71) Applicant: KT CORPORATION, Gyeonggi-do (KR)

(72) Inventors: Sung-Yeop Pyun, Seoul (KR); Jong-Sik Lee, Seoul (KR); Won-Yeol Lee, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 101 days.

(21) Appl. No.: 16/317,798

(22) PCT Filed: Jul. 12, 2017

(86) PCT No.: PCT/KR2017/007437
§ 371 (c)(1),
(2) Date: Jul. 11, 2019

(87) PCT Pub. No.: WO2018/012863
PCT Pub. Date: Jan. 18, 2018

(65) Prior Publication Data
US 2019/0379443 A1   Dec. 12, 2019

(30) Foreign Application Priority Data

Jul. 15, 2016 (KR) .......................... 10-2016-0090209
Aug. 23, 2016 (KR) .......................... 10-2016-0107087

(51) Int. Cl.
*H04W 88/04* (2009.01)
*H04B 7/155* (2006.01)
(Continued)

(52) U.S. Cl.
CPC ......... *H04B 7/15507* (2013.01); *H04B 7/026* (2013.01); *H04B 10/25759* (2013.01);
(Continued)

(58) Field of Classification Search
CPC ................ H04B 7/15507; H04B 7/026; H04B 10/25759; H04B 10/506; H04B 10/25754;
(Continued)

(56) References Cited

U.S. PATENT DOCUMENTS

2004/0106435 A1   6/2004  Bauman et al.
2004/0253003 A1*  12/2004 Farmer .............. H04Q 11/0067
                                                    398/214
(Continued)

FOREIGN PATENT DOCUMENTS

KR  20-2000-0012199 U   7/2000
KR  10-2001-0010203 A   2/2001
(Continued)

OTHER PUBLICATIONS

NPL—Siming Liu, "Special cascade LMS equalization scheme suitable for 60-GHz RoF transmission system", Opt. Express 24, 10599-10610 (May 5, 2016) (Year: 2016).*
(Continued)

*Primary Examiner* — Lan-Huong Truong
(74) *Attorney, Agent, or Firm* — IP Legal Services, LLC (57) ABSTRACT

Provided are a next generation in-building relay system and method. The system includes: a 5G signal providing unit configured to down-convert a millimeter wave radio frequency signal to an intermediate frequency signal; a 5G master hub unit configured to convert the intermediate frequency signal into a radio over fiber (RoF) signal and transmit the RoF signal; an optical coupling unit configured to couple a digital optical signal output from a master hub unit and the analog optical signal output from the 5G master hub unit and transmit the coupled signal to an optical cable; and an optical distribution unit configured to separate the digital optical signal and the analog optical signal from the coupled signal, transmit the digital optical signal to a remote (Continued)

optical relay unit, and transmit the analog optical signal to distributed remote units.

13 Claims, 11 Drawing Sheets

(51) Int. Cl.
  *H04B 7/026* (2017.01)
  *H04B 10/2575* (2013.01)
  *H04B 10/50* (2013.01)
  *H04J 14/02* (2006.01)

(52) U.S. Cl.
  CPC ........ *H04B 10/506* (2013.01); *H04J 14/0224* (2013.01); *H04W 88/04* (2013.01)

(58) Field of Classification Search
  CPC ............... H04B 10/25752; H04B 10/29; H04J 14/0282; H04J 14/0215; H04J 14/0205; H04W 88/04
  See application file for complete search history.

(56) References Cited

U.S. PATENT DOCUMENTS

| | | |
|---|---|---|
| 2007/0008939 A1 | 1/2007 | Fischer et al. |
| 2010/0054740 A1 | 3/2010 | Lee et al. |
| 2010/0215028 A1 | 8/2010 | Fischer et al. |
| 2013/0094549 A1 | 4/2013 | Ridel et al. |
| 2016/0204868 A1 | 7/2016 | Celo et al. |
| 2016/0204878 A1 | 7/2016 | Goodwill |
| 2017/0181008 A1 | 6/2017 | Fischer et al. |

FOREIGN PATENT DOCUMENTS

| | | |
|---|---|---|
| KR | 10-2005-0084176 A | 8/2005 |
| KR | 10-2008-0015462 A | 2/2008 |
| KR | 10-0812608 B1 | 3/2008 |
| KR | 10-0813897 B1 | 3/2008 |
| KR | 10-2008-0107740 A | 12/2008 |
| KR | 10-2013-0040754 A | 4/2013 |
| KR | 10-1349051 B1 | 1/2014 |
| KR | 10-2014-0137637 A | 12/2014 |
| KR | 10-2015-0098063 A | 8/2015 |

OTHER PUBLICATIONS

NPL—Liang Zhang, "Generation and transmission of multiband and multi-gigabit 60-GHz MMW signals in an RoF system with frequency quintupling technique", Opt. Express 21(8) 9899-9905 (Apr. 15, 2013) (Year: 2013).*

Arshad Chowdhury et al., "Multi-Band Transport Technologies for In-Building Host-Neutral Wireless Over Fiber Access Systems", Journal of Lightwave Technology, Aug. 15, 2010, vol. 28, No. 16, pp. 2406-2415.

* cited by examiner

NEXT GENERATION IN-BUILDING RELAY SYSTEM AND METHOD

CROSS REFERENCE TO RELATED APPLICATIONS

This application is a National Stage Patent Application of PCT International Patent Application No. PCT/KR2017/007437 (filed on Jul. 12, 2017) under 35 U.S.C. § 371, which claims priority to Korean Patent Application Nos. 10-2016-0090209 (filed on Jul. 15, 2016) and 10-2016-0107087 (filed on Aug. 23, 2016), the teachings of which are incorporated herein in their entireties by reference.

TECHNICAL FIELD

The present disclosure relates to a next generation in-building relay system and method, and more particularly, to a next generation in-building relay system and method for providing a 5G service using a wideband in superhigh frequencies of 30 GHz to 300 GHz in the building by sharing an optical cable already wired in the building.

BACKGROUND ART

A typical in-building relay improves radio coverage in a building by wiring radio frequency (RF) cables and installing antennas in the building. That is, the typical in-building relay is a solution for eliminating a shadow area in the building and responding to voice of customer (VoC).

Figure 1:
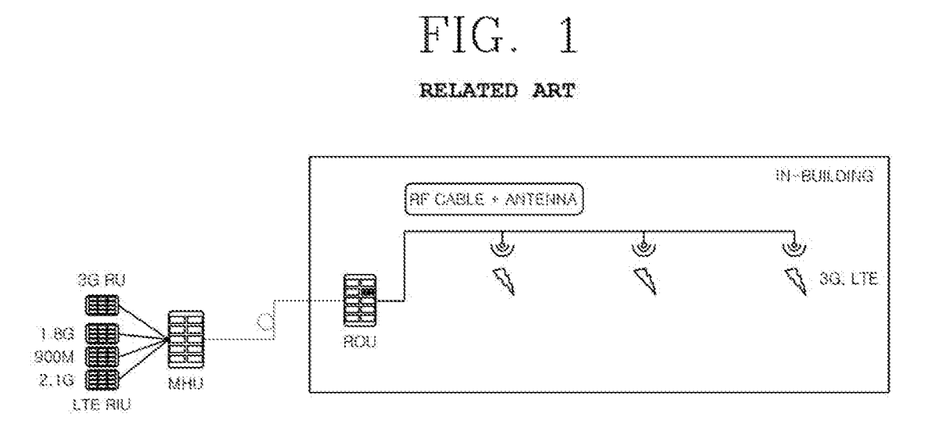
FIG. 1 is a diagram of an in-building relay system according to the related art.

As illustrated in FIG. 1, a typical in-building really includes i) a main hub unit (MHU) which receives signal sources from a radio base station and integrates and transmits the received signal sources and ii) a remote optic unit (ROU) which is installed in a building and transmits radio RF signals. The two units are connected through an optical cable.

Since typical long term evolution (LTE) services and $3^{rd}$ generation (3G: wideband code division multiple access (WCDMA)) services use frequency bands of 5 GHz or less, it is possible to transmit RF signals in buildings via RF cables.

However, $5^{th}$ generation (5G) services uses millimeter waves which are superhigh frequency bands. If such a millimeter wave is transmitted threouth RF cables, it may cause problems, such as transmission distance limitation and performance degradation. Therefore, it is impossible to provide 5G services by using the typical building relays.

DETAILED DESCRIPTION OF THE INVENTION

Technical Problem

The present disclosure has been made in an effort to solve the above problems, and provides a next generation in-building relay system and method for providing a 5G service using a wideband in superhigh frequencies of 30 GHz to 300 GHz in the building by sharing an optical cable already wired in the building.

Technical Solution

According to one aspect of the present invention, a next generation in-building relay system includes: a 5G signal providing unit configured to down-convert a millimeter wave radio frequency signal to an intermediate frequency signal; a 5G master hub unit configured to convert the intermediate frequency signal into a radio over fiber (RoF) signal, which is an analog optical signal, and transmit the RoF signal; an optical coupling unit configured to couple a digital optical signal output from a master hub unit and the analog optical signal output from the 5G master hub unit and transmit the coupled signal to an optical cable; and an optical distribution unit configured to separate the digital optical signal and the analog optical signal from the coupled signal, transmit the digital optical signal to a remote optical relay unit, and transmit the analog optical signal to distributed remote units.

According to another aspect of the present invention, a next generation in-building relay method includes: (A) by a 5G signal providing unit, down-converting a millimeter wave radio frequency signal to an intermediate frequency signal; (B) by a 5G master hub unit, converting the intermediate frequency signal into a radio over fiber (RoF) signal, which is an analog optical signal, and transmitting the RoF signal; (C) by an optical coupling unit, coupling a digital optical signal output from a master hub unit and the analog optical signal output from the 5G master hub unit and transmitting the coupled signal to an optical cable; (D) by an optical distribution unit, separating the digital optical signal and the analog optical signal from the coupled signal; and (E) by the optical distribution unit, transmitting the digital optical signal output from the master hub unit to a remote optical relay unit, and transmitting the analog optical signal output from the 5G master hub unit to distributed remote units.

Advantageous Effects

According to the present disclosure, a 5G millimeter wave service may be provided by sharing an optical cable already wired in building.

Therefore, at the time of establishing in-building 5G coverage, it is possible to minimize the installation of new optical cables, thereby reducing the installation cost.

BEST MODE

The above and other objects, features and advantages of the present invention will become more apparent from the following detailed description of the present disclosure when taken in conjunction with the accompanying drawings.

The terminology used herein is for the purpose of describing particular embodiments only and is not intended to limit the scope of the present invention. As used herein, the singular forms "a," "an" and "the" are intended to include the plural forms as well, unless the context clearly indicates otherwise. It will be understood that the terms "comprise", "include", and "have" used herein specify the presence of stated features, integers, steps, operations, elements, components, or combinations thereof, but do not preclude the presence or addition of one or more other features, integers, steps, operations, elements, components, or combinations thereof.

In the following descriptions and the accompanying drawings, descriptions of well-known functions and constructions will be omitted if they are considered to unnecessarily obscure the gist of the present invention.

Figure 2:
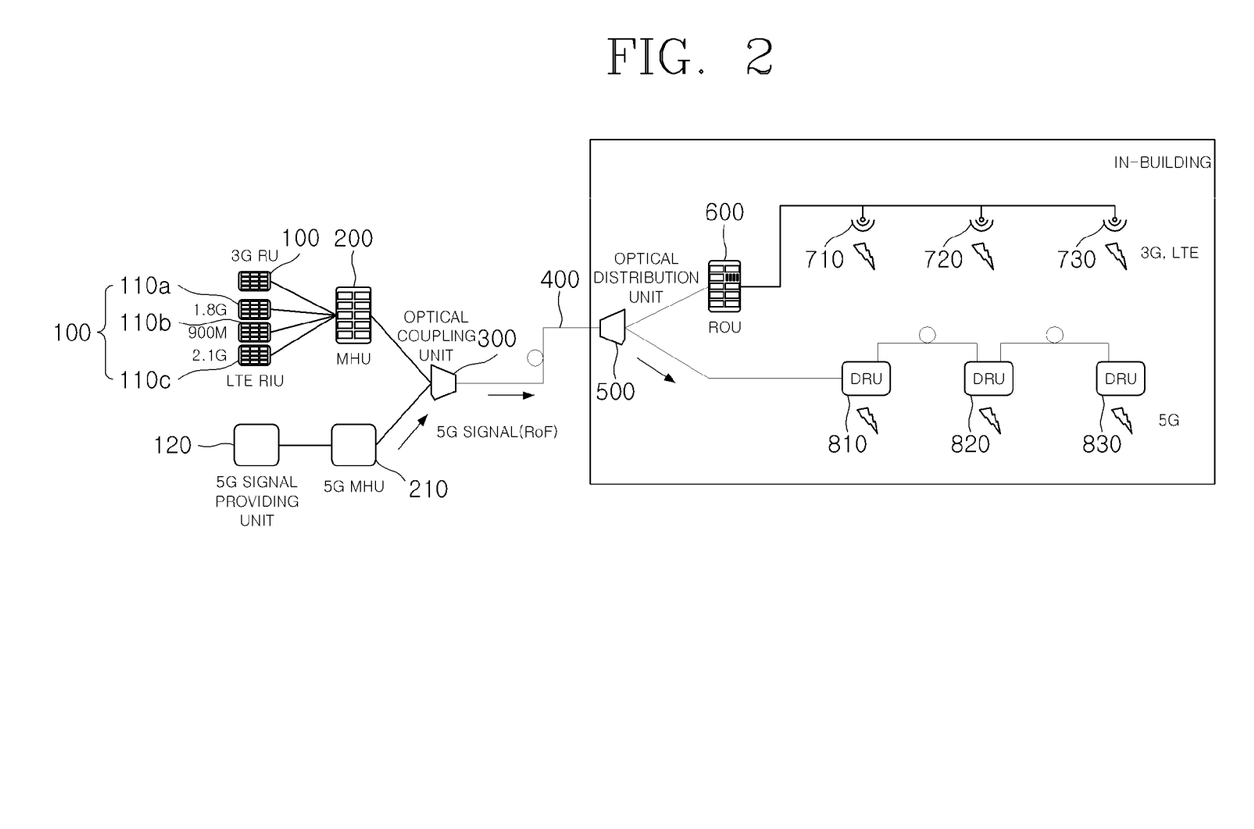
FIG. 2 is a diagram of a next generation in-building relay system according to an embodiment of the present disclosure.

FIG. 2 is a diagram of a next generation in-building relay system according to an embodiment of the present invention.

Referring to FIG. 2, the next generation in-building relay system according to the embodiment of the present disclosure includes a 3rd generation radio unit (3G RU) 100, long term evolution radio interface units (LTE RIUs) 110, a 5G signal providing unit 120, a master hub unit (MHU) 200, a 5G signal providing unit 120, a 5G MHU 210, an optical coupling unit 300, an optical cable 400, an optical distribution unit 500, a remote optical unit (ROU) 600, antennas 710 to 730, and distributed remote units (DRUs) 810 to 830.

Here, the LTE RIUs 110 include a 1.8G LTE RIU 110a, a 900M LTE RIU 110b, and a 2.1G LTE RIU 110c.

The 3G RU 100 down-converts a radio frequency signal based on a 3G service band into an intermediate frequency signal and provides the intermediate frequency signal to the MHU 200.

The 1.8G LTE RIU 110a down-converts a radio frequency signal based on a 1.8G LTE service band into an intermediate frequency signal and provides the intermediate frequency signal to the MHU 200.

The 900M LTE RIU 110b down-converts a radio frequency signal based on a 900M LTE service band into an intermediate frequency signal and provides the intermediate frequency signal to the MHU 200.

The 2.1G LTE RIU 110c down-converts a radio frequency signal based on a 2.1G LTE service band into an intermediate frequency signal and provides the intermediate frequency signal to the MHU 200.

Accordingly, the MHU 200 is connected to the 3G RU 100 and the LTE RIUs 110 to convert the intermediate frequency signal, which is down-converted from the radio frequency signal based on each service band, into a digital optical signal and transmit the digital optical signal.

Meanwhile, the 5G signal providing unit 120 down-converts a millimeter wave radio frequency signal of 30 GHz to 300 GHz based on a 5G service band into an intermediate frequency signal and transmits the intermediate frequency signal.

The 5G MHU 210 is connected to the 5G signal providing unit 120 to convert the intermediate frequency signal, which is down-converted from the millimeter wave radio frequency signal of 30 GHz to 300 GHz based on the 5G service band, into a radio over fiber (RoF) signal, which is an analog optical signal, and transmit the RoF signal.

In such a situation, the optical coupling unit 300 couples the digital optical signal transmitted from the MHU 200 and the analog optical signal transmitted from the 5G MHU 210 and transmits the coupled signal through the optical cable 400 to the optical distribution unit 500 installed in the in-building.

Meanwhile, the optical distribution unit 500 receives the optical signal transmitted through the optical cable 400, separates the optical signal transmitted from the MHU 200 and the optical signal transmitted from the 5G MHU 210, distributes the optical signal transmitted from the MHU 200 to the ROU 600, and distributes the optical signal transmitted from the 5G MHU 210 to the DRUs 810 to 830.

The ROU 600 receives the optical signal distributed by the optical distribution unit 500, extract the intermediate frequency signal, up-converts the intermediate frequency signal into the radio frequency signal of the 3G or LTE service band, and provides the radio frequency signal to the corresponding terminal through the antennas 710 to 730.

In addition, the DRUs 810 to 830 receive the optical signals distributed by the optical distribution unit 500, extract the intermediate frequency signals, up-convert the intermediate frequency signals into the radio frequency signals of the 5G service band, and transmit the radio frequency signals to the corresponding terminals.

The DRUs 810 to 830 are cascade-connected.

Figure 3:
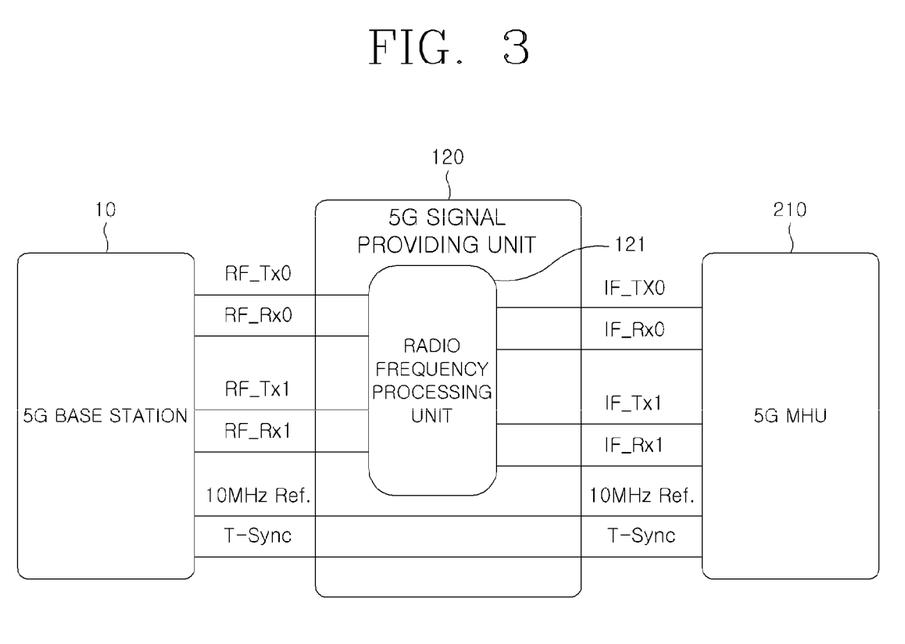
FIG. 3 is a diagram of a 5G signal providing unit of FIG. 2.

FIG. 3 is a diagram of the 5G signal providing unit of FIG. 2.

Referring to FIG. 3, the 5G signal providing unit of FIG. 2 includes a radio frequency processing unit 121. The radio frequency processing unit 121 converts the downlink millimeter wave radio frequency signal RF_Fx received from the 5G base station 10 into the intermediate frequency signal IF_Tx and transmits the intermediate frequency signal IF_Tx to the 5G MHU 210.

The radio frequency processing unit 121 converts the uplink intermediate frequency signal IF_Rx received from the 5G MHU 210 into the millimeter wave radio frequency signal RF_Rx and transmits the millimeter wave radio frequency signal RF_Rx to the 5G base station 10.

In addition, the radio frequency processing unit 121 provides the 5G MHU 210 with a reference clock (10 MHz Ref) and transmission timings (Time-Sync and T-Sync) of the uplink and the downlink, which are received from the 5G base station 10.

The 5G signal providing unit 120 may be included in the 5G base station 10 or the 5G MHU 210 according to circumstances.

The transmission timings are control signals used for providing a 5G service of a time division duplex (TDD) scheme.

Figure 4:
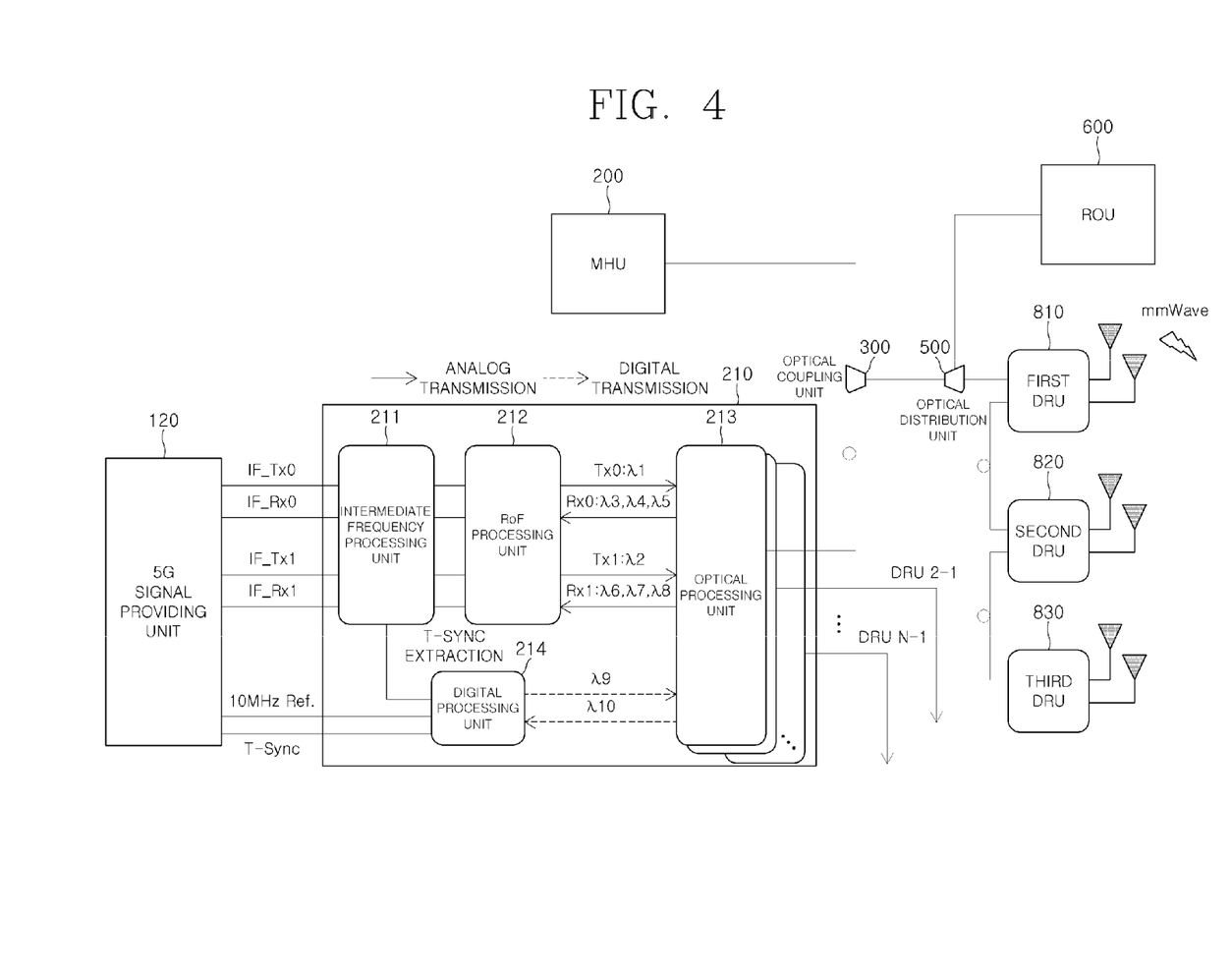
FIG. 4 is a diagram of a 5G main hub unit of FIG. 2.

FIG. 4 is a diagram of the 5G MHU of FIG. 2.

Referring to FIG. 4, the 5G MHU 210 of FIG. 2 includes an intermediate frequency processing unit 211, an RoF processing unit 212, an optical processing unit 213, and a digital processing unit 214.

The 5G MHU 210 transmits the downlink intermediate frequency signal IF_Tx received from the 5G signal providing unit 120 to the DRUs 810 to 830 by sharing the existing optical cable 400 through the optical coupling unit 300, and transmits the uplink intermediate frequency signal IF_Rx received from the DRUs 810 to 830 to the 5G signal providing unit 120.

At this time, the 5G MHU 210 may support a plurality of branches and connect a plurality of DRUs 810 to 830 for each branch.

Although the embodiment of the present disclosure is based on the three-stage cascade of the DRUs 810 to 830, it may be extended and implemented even at the time of the cascade addition of the DRUs 810 to 830.

In this configuration, the intermediate frequency processing unit 211 may divide the broadband intermediate frequency signals of the uplink and the downlink into channels and may select and transmit the channels according to traffic and interference conditions in the building.

For example, if the 1 GHz broadband intermediate frequency signals of the uplink or the downlink is divided into ten 100 MHz channels and if there is little traffic in the building or external interference is sever, only some of the 10 channels are selected and transmitted to the RoF processing unit 212.

In addition, a data stream (stream0=IF_Tx0+IF_Rx0) may be selected and transmitted according to traffic and interference conditions in the building.

When the transmission timing is not provided from the 5G signal providing unit 120, the intermediate frequency processing unit 211 may extract the transmission timing from the intermediate frequency signal and transmit the extracted transmission timing to the digital processing unit 214.

Next, the RoF processing unit 212 converts the downlink intermediate frequency signals IF_Tx0 and IF_Tx1 into the stream-specific RoF signals (Tx0: $\lambda 1$, Tx1: $\lambda 2$), transmits the stream-specific RoF signals to the optical processing unit 213, integrates the uplink RoF signals (Rx0: $\lambda 3$, $\lambda 4$, and $\lambda 5$, Rx1: $\lambda 6$, $\lambda 7$, and $\lambda 8$) received from the plurality of DRUs 810 to 830 connected to the plurality of branches, converts the uplink RoF signals into stream IF signals IF_Rx0 and IF_Rx1, and transmits the stream IF signals IF_Rx0 and IF_Rx1 to the intermediate frequency processing unit 211.

At this time, the RoF processing unit 212 changes the RoF optical wavelength in consideration of the optical wavelength being used in the existing optical cable.

The digital processing unit 214 may convert the reference clock (10 MHz Ref.) and the transmission timing (T-Sync) received from the 5G signal providing unit 120 into the digital control signal $\lambda 9$, transmit the digital control signal $\lambda 9$ to the optical processing unit 213, receive the state information signal $\lambda 10$ of the DRUs 810 to 830 from the optical processing unit 213, and perform status monitoring on the DRUs 810 to 830.

Next, the optical processing unit 213 performs wavelength division multiplexing (WDM) on the downlink RoF signals (Tx0: $\lambda 1$, Tx0: $\lambda 2$) and the digital control signal $\lambda 9$, transmits the signals to the DRUs 810 to 830 through the optical cable, performs WDM demultiplexing on the signals integrally received from the DRUs 810 to 830 connected to the lower branches, transmits the uplink intermediate frequency signal (Rx0: $\lambda 3$, $\lambda 4$, $\lambda 5$+Rx1: $\lambda 6$, $\lambda 7$, $\lambda 8$) to the RoF processing unit 212, and transmits the state information signal 10 of the DRUs 810 to 830 to the digital processing unit 214.

At this time, the optical processing unit 213 may change the wavelength of the RoF signal in consideration of the wavelength being used in the existing optical cable.

Figure 5:
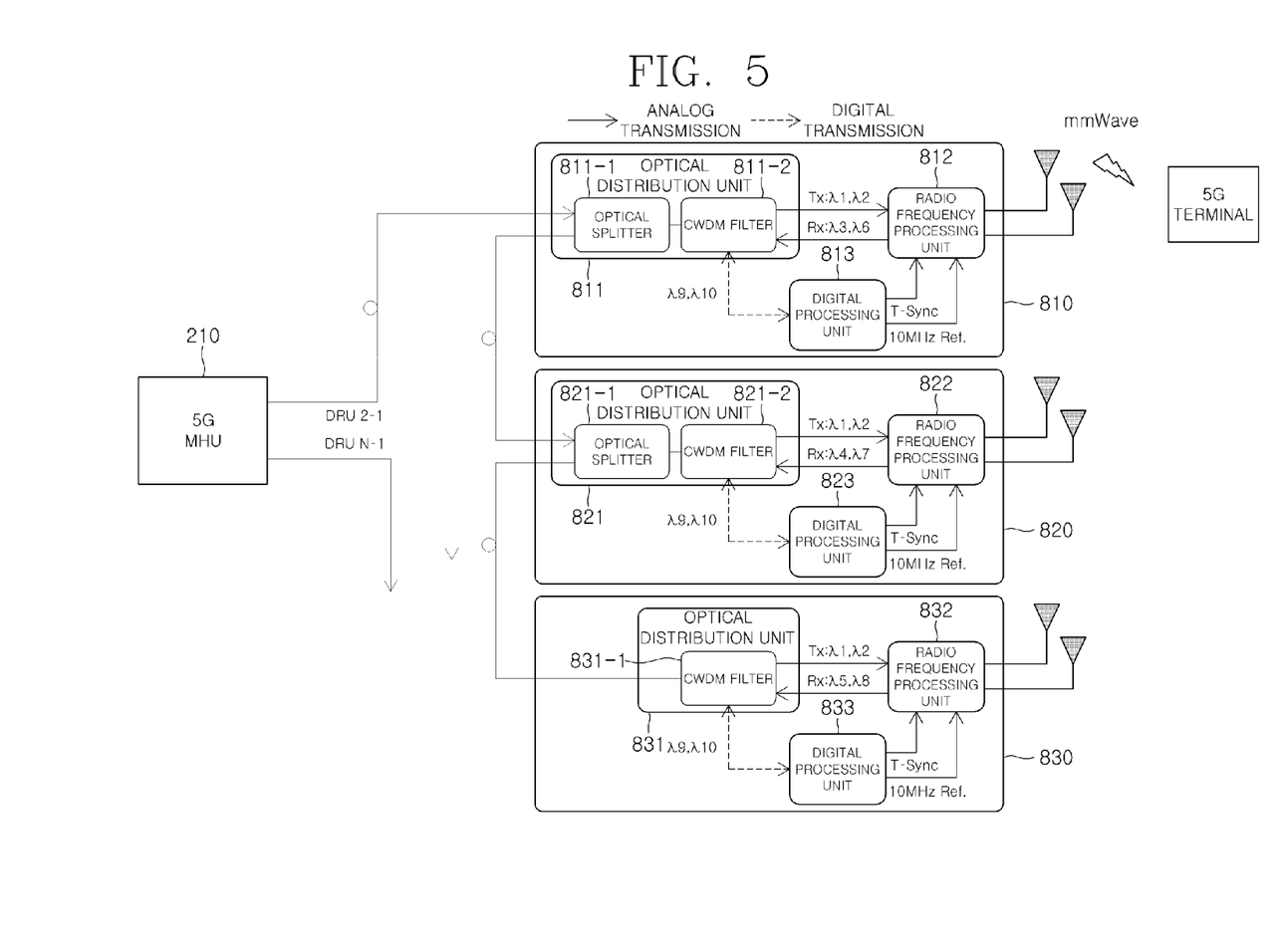
FIG. 5 is a diagram of distributed remote units of FIG. 2.

FIG. 5 is a diagram of the DRUs of FIG. 2.

Referring to FIG. 5, the DRUs of FIG. 2 include optical distribution units 811, 821, and 831, radio frequency processing units 812, 822, and 832, and digital processing units 813, 823 and 833, respectively.

The first optical distribution unit 811 and the second optical distributor 821 include optical splitters 811-1 and 821-1 and coarse wavelength division multiplexing (CWDM) filters 811-2 and 821-2, respectively, and the last optical distribution unit 831 has only a CWDM filter 831-1.

The optical splitters 811-1 and 821-1 transmit signals received from the 5G MHU to the lower DRUs and receive signals from the lower DRUs.

The CWDM filters 811-2, 821-2, and 831-1 perform WDM demultiplexing on the signals received from the 5G MHU to generate the downlink RoF signal and the digital control signal. The CWDM filters 811-2, 821-2, and 831-1 perform WDM on the uplink RoF signal and the state information signal.

The DRUs 810 to 830 provide the 5G service to the 5G terminal by converting the downlink RoF signal received from the 5G MHU 210 into the millimeter wave radio frequency signal and transmitting the millimeter wave radio frequency signal, converts the uplink millimeter wave radio frequency signal received from the 5G terminal into the RoF signal, and transmits the RoF signal to the 5G MHU 210.

To this end, the optical distribution units 811, 821, and 831 transmit signals (downlink RoF signal, control signal, and the like) received from the 5G MHU 210 to the lower DRUs 820 and 830 (which is performed by the optical splitter), perform WDM demultiplexing (which is performed by the CWDM filter), transmit the downlink RoF signal (Tx: $\lambda 1$, $\lambda 2$) to the radio frequency processing units 812, 822, and 832, and transmit the digital control signals $\lambda 9$ and $\lambda 10$ to the digital processing units 813, 823, and 833.

In addition, the optical distribution units 811, 821, and 831 perform WDM on the signals (uplink RoF signal, DRU state information signal, and the like) received from the lower DRUs 820 and 830, the uplink RoF signals received from the radio frequency processing units 812, 822, and 832, and the state information of the DRUs 810 to 830 received from the digital processing units 813, 823, and 833, and transmit the signals to the upper DRUs 810 and 820 (the first DRU transmits the signal to the 5G MHU).

At this time, the same wavelength (Tx: $\lambda 1$, $\lambda 2$) is allocated to the downlink RoF signals of the same branch, and the wavelengths of the uplink RoF signals are differently allocated for each of the DRUs 810, 820, and 830 and then transmitted.

For example, the uplink RoF wavelength of the first DRU 810 may be allocated to Rx0: $\lambda 3$ and Rx1: $\lambda 6$, the uplink RoF wavelength of the second DRU 820 may be allocated to Rx0: $\lambda 4$ and Rx1: $\lambda 7$, and the uplink RoF wavelength of the third DRU 830 may be allocated to Rx0: $\lambda 5$ and Rx1: $\lambda 8$.

At this time, the optical distribution units 811, 821, and 831 are able to change the wavelength of the RoF signal in consideration of the wavelength being used in the existing optical cable.

In embodiments of the present disclosure, in order not to affect the services of the lower DRU connected to the cascade even if one DRU fails, the optical distribution units 811 and 821 are implemented by the optical splitters 811-1 and 821-1 and the CWDM filters 811-2 and 821-2. However, the embodiments are not limited thereto. The optical distribution unit may be implemented by other methods as long as only the function of the optical distribution unit described above is satisfied.

Meanwhile, the digital processing units 813, 823, and 833 receive the digital control signal $\lambda 9$ from the optical distribution units 811, 821, and 831, restore the reference clock (10 MHz Ref.) and the transmission timing (T-Sync), transmits the same to the radio frequency processing units 812, 822, and 833, and transmit the state information signal λ10 of the DRU to the optical distribution unit 811.

The radio frequency processing units 812, 822, and 833 convert the downlink RoF signals (Tx0: λ1 and Tx1: λ2) received from the optical distribution units 811, 821, and 831 into the millimeter wave radio frequency signals RF_Tx0 and RF_Tx1, transmit the millimeter wave radio frequency signals RF_Tx0 and RF_Tx1 through the antenna, convert the uplink millimeter wave radio frequency signals RF_Rx0 and RF_Rx1 received from the 5G terminal into the uplink RoF signals, and transmit the uplink RoF signals to the optical distribution units 811, 821, and 831.

The radio frequency processing units 812, 822, and 832 provide the 5G services of both the time division duplex (TDD) scheme and the frequency division duplex (FDD) scheme through the transmission timing (T-Sync) and the reference clock received from the digital processing units 813, 823, and 833.

MODE OF THE INVENTION

Figure 6:
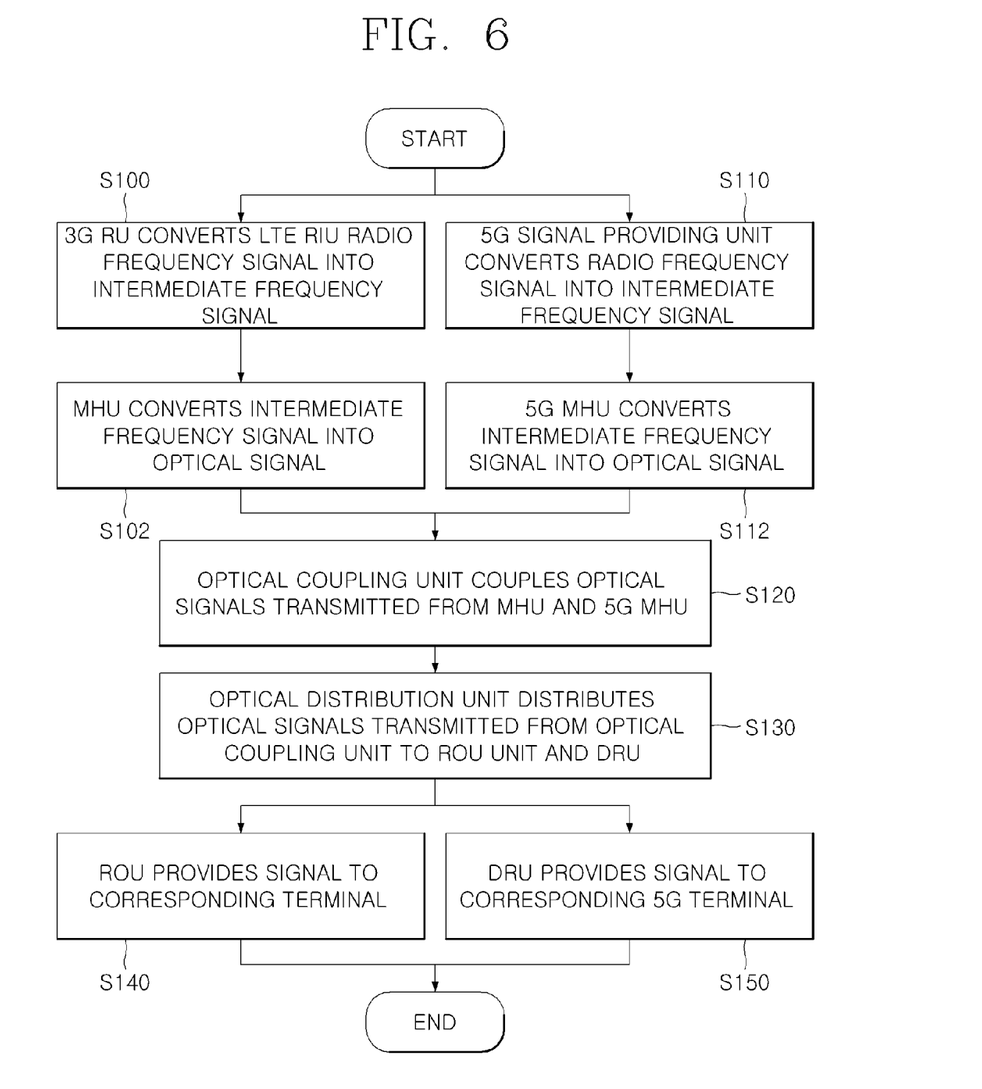
FIG. 6 is a flowchart of a next generation in-building downlink relay method according to an embodiment of the present invention.

FIG. 6 is a flowchart of a next generation in-building downlink relay method according to an embodiment of the present disclosure.

Referring to FIG. 6, in the next generation in-building downlink relay method according to the embodiment of the present disclosure, the 3G RU 100 down-converts a radio frequency signal based on a 3G service band into an intermediate frequency signal and provides the intermediate frequency signal to the MHU 200.

The 1.8G LTE RIU 110a down-converts a radio frequency signal based on a 1.8G LTE service band into an intermediate frequency signal and provides the intermediate frequency signal to the MHU 200.

The 900M LTE RIU 110b down-converts a radio frequency signal based on a 900M LTE service band into an intermediate frequency signal and provides the intermediate frequency signal to the MHU 200.

The 2.1G LTE RIU 110c down-converts a radio frequency signal based on a 2.1G LTE service band into an intermediate frequency signal and provides the intermediate frequency signal to the MHU 200 (S100).

Accordingly, the MHU 200 is connected to the 3G RU 100 and the LTE RIUs 110 to convert the intermediate frequency signal, which is down-converted from the radio frequency signal based on each service band, into a digital optical signal and transmit the digital optical signal (S102).

Meanwhile, the 5G signal providing unit 120 down-converts a millimeter wave radio frequency signal of 30 GHz to 300 GHz based on a 5G service band into an intermediate frequency signal and transmits the intermediate frequency signal (S110).

The 5G signal providing unit 120 includes a radio frequency processing unit 121. The radio frequency processing unit 121 converts the downlink millimeter wave radio frequency signal RF_Fx received from the 5G base station 10 into an intermediate frequency signal IF_Tx and transmits the intermediate frequency signal IF_Tx to the 5G MHU 210.

At this time, the radio frequency processing unit 121 provides the 5G MHU 210 with a reference clock (10 MHz Ref) and transmission timings (Time-Sync and T-Sync) of the uplink and the downlink, which are received from the 5G base station 10.

The 5G MHU 210 is connected to the 5G signal providing unit 120 to convert the intermediate frequency signal, which is down-converted from the millimeter wave radio frequency signal of 30 GHz to 300 GHz based on the 5G service band, into a radio over fiber (RoF) signal, which is an analog optical signal, and transmit the RoF signal (S112).

In such a situation, the optical coupling unit 300 couples the digital optical signal transmitted from the MHU 200 and the analog optical signal transmitted from the 5G MHU 210 and transmits the coupled signal through the optical cable 400 to the optical distribution unit 500 installed in the in-building (S120).

Meanwhile, the optical distribution unit 500 receives the optical signal transmitted through the optical cable 400, separates the optical signal transmitted from the MHU 200 and the optical signal transmitted from the 5G MHU 210, distributes the optical signal transmitted from the MHU 200 to the ROU 600, and distributes the optical signal transmitted from the 5G MHU 210 to the DRUs 810 to 830 (S130).

Accordingly, the ROU 600 receives the optical signal distributed by the optical distribution unit 500, extract the intermediate frequency signal, up-converts the intermediate frequency signal into the radio frequency signal of the 3G or LTE service band, and provides the radio frequency signal to the corresponding terminal through the antennas 710 to 730 (S140).

In addition, the DRUs 810 to 830 receive the optical signals distributed by the optical distribution unit 500, extract the intermediate frequency signals, up-convert the intermediate frequency signals into the radio frequency signals of the 5G service band, and transmit the radio frequency signals to the corresponding terminals (S150).

Figure 7:
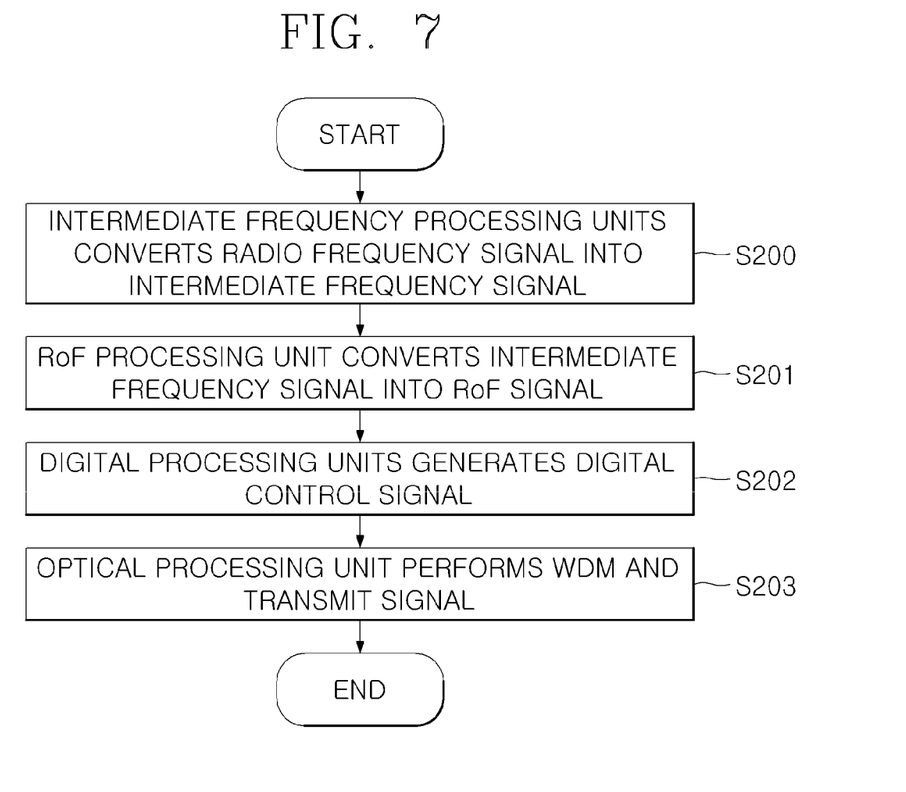
FIG. 7 is a flowchart illustrating a process of converting an intermediate frequency signal into an optical signal in a 5G main hub unit in FIG. 6.

FIG. 7 is a flowchart illustrating a process of converting the intermediate frequency signal into the optical signal in the 5G MHU in FIG. 6.

Referring to FIG. 7, the intermediate frequency processing unit 211 of the 5G MHU in FIG. 6 converts the radio frequency signal into the intermediate frequency signal and outputs the intermediate frequency signal (S200).

At this time, the intermediate frequency processing unit 211 may divide the broadband intermediate frequency signal of the downlink into channels and may select and transmit the channels according to traffic and interference conditions in the building.

For example, if the 1 GHz broadband intermediate frequency signals of the downlink is divided into ten 100 MHz channels and if there is little traffic in the building or external interference is sever, only some of the 10 channels are selected and transmitted to the RoF processing unit 212.

In addition, a data stream (stream0=IF_Tx0+IF_Rx0) may be selected and transmitted according to traffic and interference conditions in the building.

Next, the RoF processing unit 212 converts the downlink intermediate frequency signals IF_Tx0 and IF_Tx1 into stream-specific RoF signals (Tx0: λ1, Tx1: λ2) and transmits the stream-specific RoF signals to the optical processing unit 213 (S201).

At this time, the RoF processing unit 212 is able to change the RoF optical wavelength in consideration of the optical wavelength being used in the existing optical cable.

When the transmission timing is not provided from the 5G signal providing unit 120, the RoF processing unit 212 may extract the transmission timing from the intermediate frequency signal and transmit the extracted transmission timing to the digital processing unit 214.

Next, the digital processing unit 214 converts the reference clock (10 MHz Ref.) and the transmission timing (T-Sync) received from the 5G signal providing unit 120 into the digital control signal λ9 (S202).

Next, the optical processing unit 213 performs WDM on the downlink RoF signals (Tx0: λ1, Tx0: λ2) and the digital control signal λ9 and transmits the signals to the DRUs 810 to 830 through the optical cable (S203).

Figure 8:
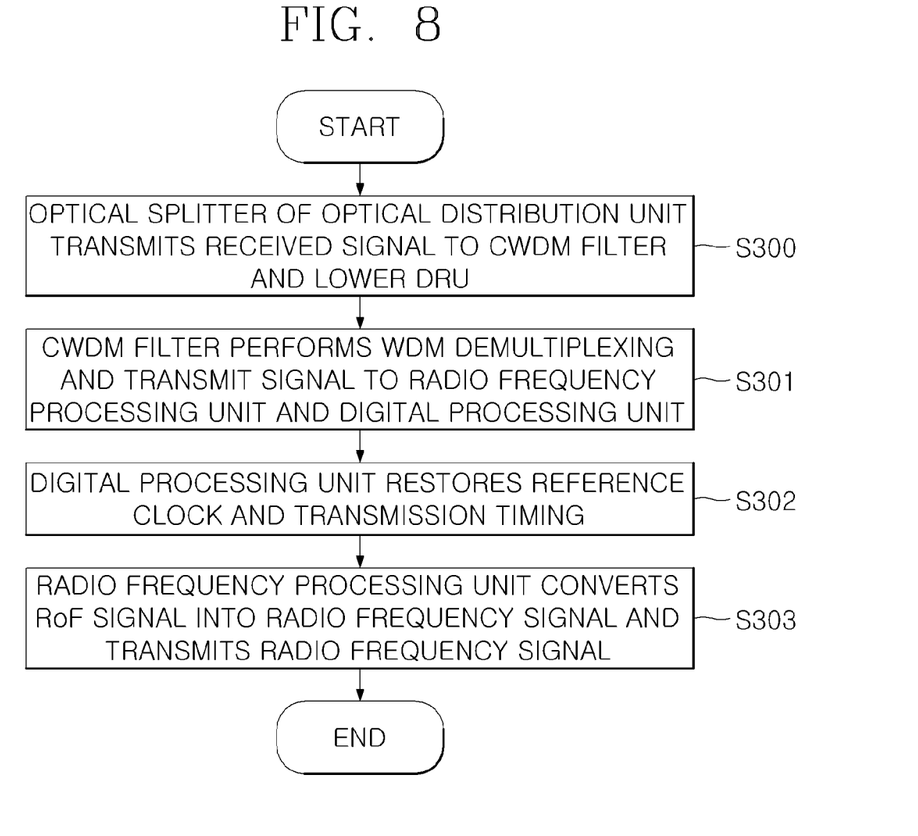
FIG. 8 is a flowchart illustrating a process of a distributed remote unit for providing a signal to a corresponding 5G terminal in FIG. 6.

FIG. 8 is a flowchart illustrating a process of the DRU for providing the signal to the corresponding 5G terminal in FIG. 6.

Referring to FIG. 8, the optical splitters 811-1 and 811-2 of the optical distributions units 811 and 821 transmit signals (downlink RoF signal, control signal, and the like) received from the 5G MHU 210 to the CWDM filters 811-2, 821-2, and 831-2 and the lower DRUs 820 and 830.

The CWDM filters 812, 822, and 832 perform WDM demultiplexing, transmit the downlink RoF signals (Tx: λ1, λ2) to the radio frequency processing units 812, 822, and 832, and transmits the digital control signals λ9 and λ10 to the digital processing units 813, 823, and 833 (S301).

Next, the digital processing units 813, 823, and 833 receive the digital control signal λ9 from the optical distribution units 811, 821, and 831, restore the reference clock (10 MHz Ref.) and the transmission timing (T-Sync), and transmit the same to the radio frequency processing units 812, 822, and 833 (S302).

The radio frequency processing units 812, 822, and 833 convert the downlink RoF signals (Tx0: λ1 and Tx1: λ2) received from the optical distribution units 811, 821, and 831 into the millimeter wave radio frequency signals RF_Tx0 and RF_Tx1, and transmit the millimeter wave radio frequency signals RF_Tx0 and RF_Tx1 through the antenna (S303).

At this time, the radio frequency processing units 812, 822, and 832 may provide the 5G services of both the time division duplex (TDD) scheme and the frequency division duplex (FDD) scheme through the transmission timing (T-Sync) and the reference clock received from the digital processing units 813, 823, and 833.

Figure 9:
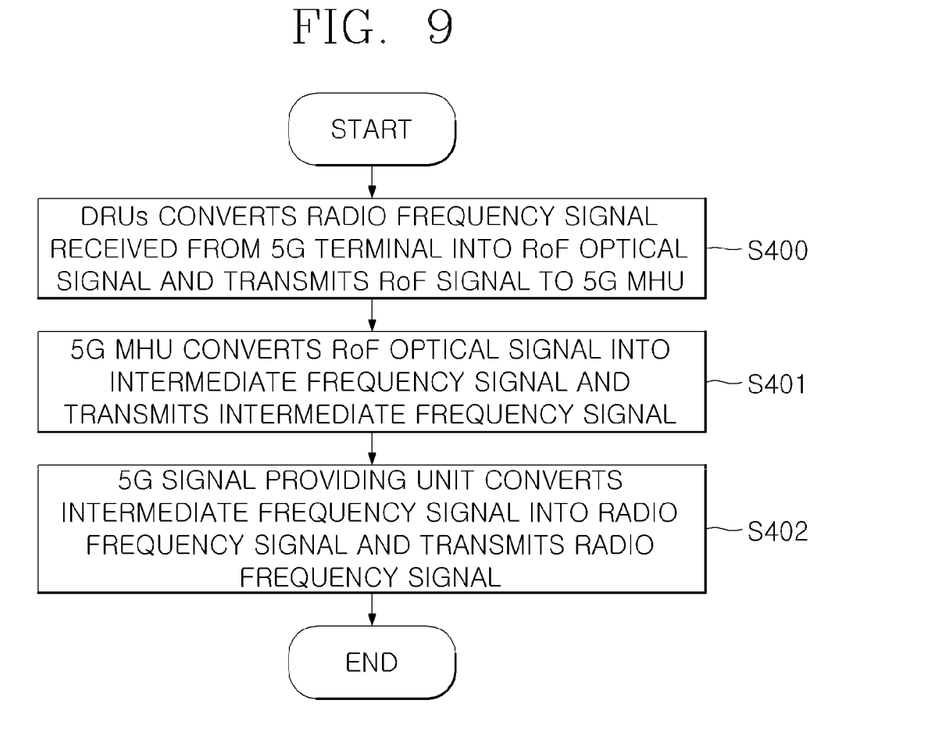
FIG. 9 is a flowchart of a next generation in-building uplink relay method according to an embodiment of the present disclosure.

FIG. 9 is a flowchart illustrating a next generation in-building uplink relay method according to an embodiment of the present disclosure.

Referring to FIG. 9, in the next generation uplink in-building relay method according to the embodiment of the present disclosure, the DRUs 810 to 830 convert the uplink millimeter wave radio frequency signals received from the 5G terminal into RoF signals and transmit the RoF signals to the 5G MHU 210 (S400).

Accordingly, the 5G MHU 210 provides the uplink intermediate frequency signal IF_Rx to the 5G signal providing unit (S401).

The 5G signal providing unit converts the uplink intermediate frequency signal received from the 5G MHU 210 into the millimeter wave radio frequency signal and transmits the millimeter wave radio frequency signal to the 5G base station (S402).

To this end, the 5G signal providing unit 120 includes the radio frequency processing unit 121. The radio frequency processing unit 121 converts the uplink intermediate frequency signal IF_Rx received from the 5G MHU 210 into the millimeter wave radio frequency signal RF_Rx and transmits the millimeter wave radio frequency signal RF_Rx to the 5G base station 10.

Figure 10:
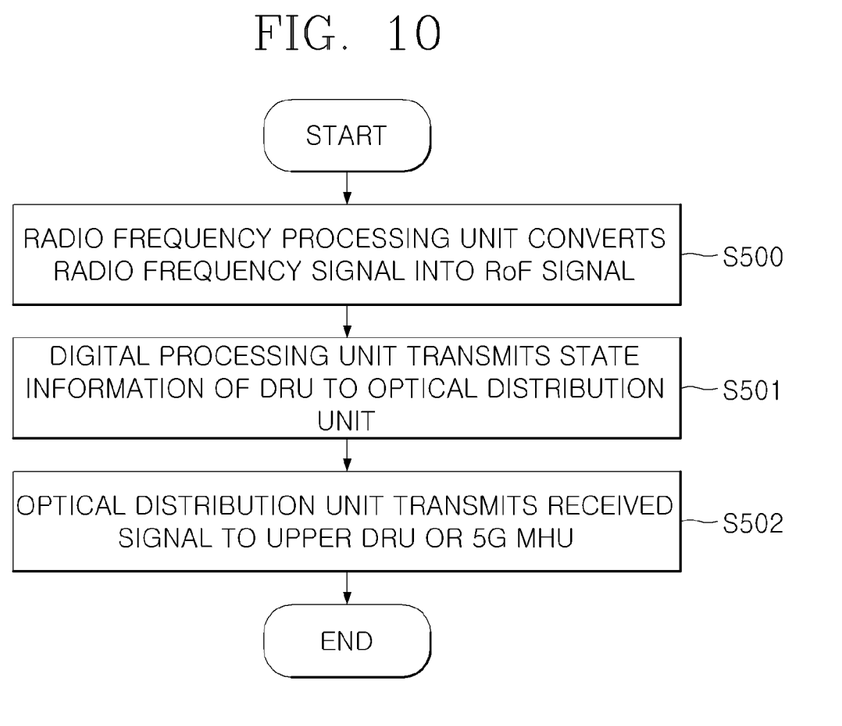
FIG. 10 is a flowchart of a process of distributed remote units for transmitting uplink signals to a 5G main hub unit in FIG. 9.

FIG. 10 is a flowchart of a process of the DRUs for transmitting uplink signals to the 5G MHU in FIG. 9.

Referring to FIG. 10, in the process of the DRUs for transmitting the uplink signals to the 5G MHU in FIG. 9, the radio frequency processing units 812, 822, and 832 of the DRUs convert the uplink millimeter wave radio frequency signals RF_Rx0 and RF_Rx1 received from the 5G terminal into the uplink RoF signals and transmit the uplink RoF signals to the optical distribution units 811, 821, and 831 (S500).

Meanwhile, the digital processing units 813, 823, and 833 transmit the state information signal λ10 of the DRU to the optical distribution unit 811 (S501).

Next, the optical distribution units 811, 821, and 831 perform WDM on the signals (uplink RoF signal, DRU state information signal, and the like) received from the lower DRUs 820 and 830, the uplink RoF signals received from the radio frequency processing units 812, 822, and 832, and the state information of the DRUs 810 to 830 received from the digital processing units 813, 823, and 833, and transmit the signals to the upper DRUs 810 and 820 (the first DRU transmits the signal to the 5G MHU) (S502).

At this time, the uplink RoF signal wavelengths of the same branch are differently allocated for each of the DRUs 810, 820, and 830 and then transmitted.

For example, the uplink RoF wavelength of the first DRU 810 may be allocated to Rx0: λ3, Rx1: λ6, the uplink RoF wavelength of the second DRU 820 may be allocated to Rx0: λ4, Rx1: λ7, and the uplink RoF wavelength of the third DRU 830 may be allocated to Rx0: λ5, Rx1: λ8.

At this time, the optical distribution units 811, 821, and 831 are able to change the wavelength of the RoF signal in consideration of the wavelength being used in the existing optical cable.

Figure 11:
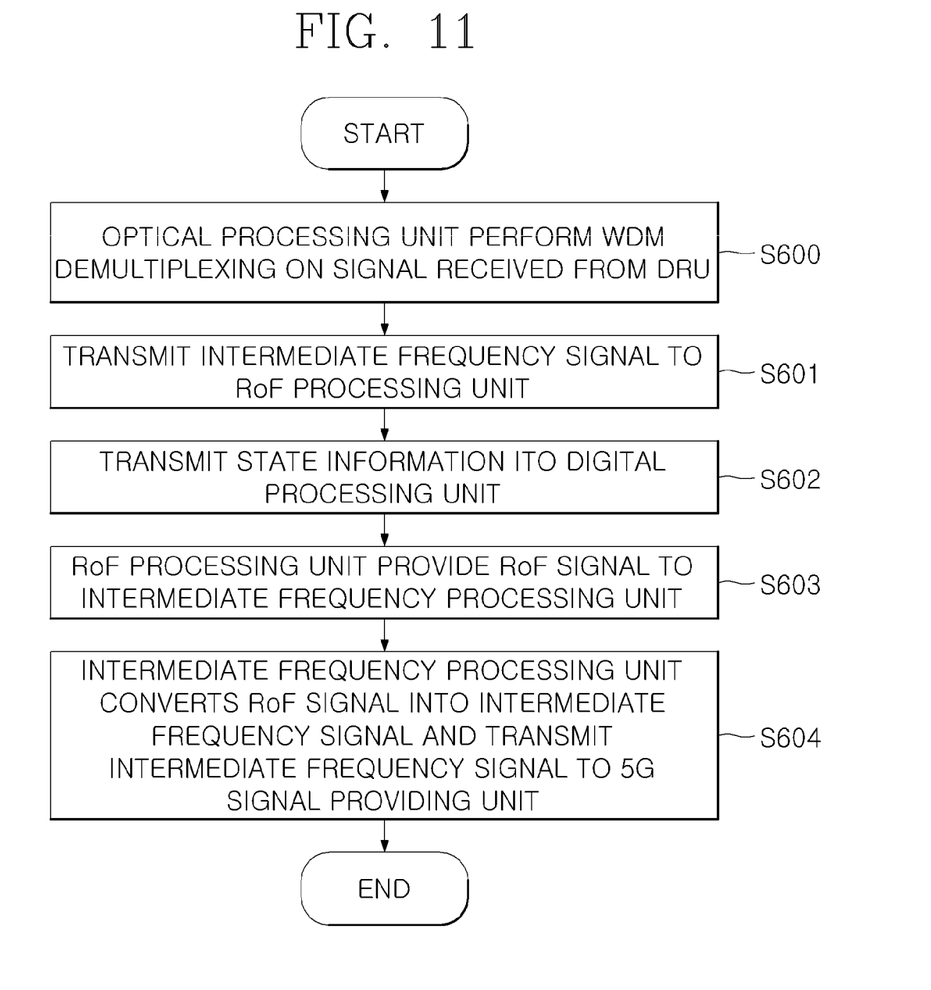
FIG. 11 is a flowchart of a process of a 5G main hub unit for providing an uplink intermediate frequency signal (IF_Rx) to a 5G signal providing unit in FIG. 9.

FIG. 11 is a flowchart of a process of the 5G MHU for providing the uplink intermediate frequency signal IF_Rx to the 5G signal providing unit in FIG. 9.

Referring to FIG. 11, in the process of the 5G MHU for providing the uplink intermediate frequency signal IF_Rx to the 5G signal providing unit in FIG. 9, the optical processing unit 213 performs WDM demultiplexing on the signals integrally received from the DRUs 810 to 830 connected to the lower branch (S600), transmit the uplink intermediate frequency signals (Rx: λ3, λ4, λ5+Rx1: λ6, λ7, λ8) to the RoF processing unit 212 (S601), and transmits the state information signal λ10 of the DRUs 810 to 830 to the digital processing unit 214 (S602).

At this time, the optical processing unit 213 may change the wavelength of the RoF signal in consideration of the wavelength being used in the existing optical cable.

Accordingly, the digital processing unit 214 may receive the state information signal λ10 of the DRUs 810 to 830 from the optical processing unit 213 and perform state monitoring on the lower DRUs 810 to 830.

Next, the RoF processing unit 212 integrates the uplink RoF signals (Rx0: λ3, λ4, λ5, and Rx1: λ6, λ7, λ8) received from the plurality of DRUs 810 to 830 connected to the plurality of branches and transfers the integrated uplink RoF signals to the intermediate frequency processing unit 211 (S603).

At this time, the RoF processing unit 212 are able to change the RoF optical wavelength in consideration of the optical wavelength being used in the existing optical cable.

Next, the intermediate frequency processing unit 211 integrates the uplink RoF signals (Rx0: λ3, λ4, λ5 and Rx1: λ6, λ7, λ8) received from the plurality of DRUs 810 to 830 connected to the plurality of branches, converts uplink RoF signals into the stream-specific intermediate frequency signals IF_Rx0 and IF_Rx1, and provides the stream-specific intermediate frequency signals IF_Rx0 and IF_Rx1 to the 5G signal providing unit 120 (S604).

According to embodiments of the present disclosure, the 5G millimeter wave service is provided by sharing the optical cable already wired in the building.

Therefore, at the time of establishing in-building 5G coverage, the installation of new optical cables may be minimized, thereby reducing the installation cost The above description is merely illustrative of the technical idea of the present invention, and various modifications and changes may be made thereto by those skilled in the art without departing from the essential characteristics of the present invention. Therefore, the embodiments of the present invention are not intended to limit the technical spirit of the present invention but to illustrate the technical idea of the present invention, and the technical spirit of the present invention is not limited by these embodiments. The scope of protection of the present invention should be interpreted by the appending claims, and all technical ideas within the scope of equivalents should be construed as falling within the scope of the present invention.

The invention claimed is:

1. A next generation in-building relay system comprising:
a fifth generation (5G) signal providing unit configured to down-convert a millimeter wave radio frequency signal to an intermediate frequency signal;
a 5G master hub unit configured to convert the intermediate frequency signal into a radio over fiber (RoF) signal, which is an analog optical signal, and transmit the RoF signal;
an optical coupling unit configured to couple a digital optical signal output from a master hub unit and the analog optical signal output from the 5G master hub unit and transmit the coupled signal to an optical cable; and
an optical distribution unit configured to separate the digital optical signal and the analog optical signal from the coupled signal transmitted from the optical coupling unit, transmit the digital optical signal to a remote optical relay unit, and transmit the analog optical signal to distributed remote units, wherein:
the 5G signal providing unit converts an uplink intermediate frequency signal received from the 5G master hub unit into a millimeter wave radio frequency signal, transmits the millimeter wave radio frequency signal to a 5G base station, and provides the 5G master hub unit with a reference clock and transmission timings of an uplink and a downlink, which are received from the 5G base station;
the 5G master hub unit transmits an uplink intermediate frequency signal received from the distributed remote unit to the 5G signal providing unit; and
the distributed remote units convert uplink millimeter wave radio frequency signals received from a 5G terminal into RoF signals and transmit the RoF signals to the 5G master hub unit.

2. The next generation in-building relay system of claim 1, wherein the distributed remote units are cascade-connected.

3. The next generation in-building relay system of claim 1, wherein the 5G signal providing unit is configured to:
convert a downlink millimeter wave radio frequency signal received from the 5G base station into an intermediate frequency signal;
transmit the intermediate frequency signal to the 5G master hub unit;
convert an uplink intermediate frequency signal received from the 5G master hub unit into a millimeter wave radio frequency signal;
transmit the millimeter wave radio frequency signal to the 5G base station; and
provide the 5G master hub unit with the reference clock and the transmission timings of the uplink and the downlink, which are received from the 5G base station.

4. The next generation in-building relay system of claim 1, wherein the 5G master hub unit comprises:
an intermediate frequency processing unit configured to divide broadband intermediate frequency signals of the uplink and the downlink into channels and select and transmit the channels according to traffic and interference conditions in a building;
an RoF processing unit configured to convert downlink intermediate frequency signals into stream-specific RoF signals, integrate uplink RoF signals, convert the signals into stream-specific intermediate frequency signals, and transmit the stream-specific intermediate frequency signals to the intermediate frequency processing unit;
a digital processing unit configured to convert a reference clock and a transmission timing received from the 5G signal providing unit into a digital control signal, receive a state information signal of the distributed remote unit, and perform state monitoring on the distributed remote unit; and
an optical processing unit configured to perform wavelength division multiplexing (WDM) on the downlink RoF signal and the digital control signal, transmit the signals through an optical cable, perform WDM demultiplexing on the signals received from the distributed remote unit, transmit the uplink intermediate frequency signal to the RoF processing unit, and transmit the state information signal of the distributed remote unit to the digital processing unit.

5. The next generation in-building relay system of claim 4, wherein, when the transmission timing is not provided from the 5G signal providing unit, the intermediate frequency processing unit extracts the transmission timing from the intermediate frequency signal and transmits the extracted transmission timing to the digital processor.

6. The next generation in-building relay system of claim 1, wherein the distributed remote unit comprises:
an optical distribution unit configured to transmit the signal received from the 5G master hub unit to the lower distributed remote unit, perform WDM demultiplexing to generate a downlink RoF signal and a digital control signal, perform WDM on the signal received from the lower distributed remote unit, the uplink RoF signal, and the state information signal, and transmit the multiplexed signals to the 5G master hub unit;
a digital processing unit configured to receive the digital control signal from the optical distribution unit, restore a reference clock and a transmission timing, and transmit a status information signal to the optical distribution unit; and
a radio frequency processing unit configured to convert the downlink RoF signal received from the optical distribution unit into a millimeter wave radio frequency signal, transmit the millimeter wave radio frequency signal through an antenna, convert the uplink millimeter wave radio frequency signal received from the 5G terminal into an uplink RoF signal, and transmit the uplink RoF signal to the optical distribution unit.

7. The next generation in-building relay system of claim 6, wherein the radio frequency processing unit provides a 5G service of a time division duplex scheme or a frequency division duplex (FDD) scheme through the transmission timing and the reference clock received from the digital processing unit.

8. The next generation in-building relay system of claim 6, wherein the optical distribution unit comprises:
- an optical splitter configured to transmit a signal received from the 5G master hub unit to the lower distributed remote unit and receive a signal from the lower distributed remote unit; and
- a coarse wavelength division multiplexing (CWDM) filter configured to perform WDM demultiplexing on a signal received from a second master hub unit to generate a downlink RoF signal and a digital control signal, and perform WDM on an uplink RoF signal and a state information signal.

9. A next generation in-building relay method comprising:
- (A) by a fifth generation (5G) signal providing unit, down-converting a millimeter wave radio frequency signal to an intermediate frequency signal;
- (B) by a 5G master hub unit, converting the intermediate frequency signal down-converted by the 5G signal providing unit into a radio over fiber (RoF) signal, which is an analog optical signal, and transmitting the RoF signal;
- (C) by an optical coupling unit, coupling a digital optical signal output from a master hub unit and the analog optical signal output from the 5G master hub unit and transmitting the coupled signal to an optical cable;
- (D) by an optical distribution unit, separating the digital optical signal and the analog optical signal from the coupled signal transmitted from the optical coupling unit; and
- (E) by the optical distribution unit, transmitting the digital optical signal to a remote optical relay unit, and transmitting the analog optical signal to distributed remote units, wherein (B) the converting of the intermediate frequency signal comprises:
- (B-1) by an intermediate frequency processing unit of the 5G master hub unit, dividing broadband intermediate frequency signals of an uplink and a downlink into channels and selecting and transmitting the channels according to traffic and interference conditions in a building;
- (B-2) by an RoF processing unit of the 5G master hub unit, converting downlink intermediate frequency signals into stream-specific RoF signals;
- (B-3) by a digital processing unit of the 5G master hub unit, converting a reference clock and a transmission timing received from the 5G signal providing unit into a digital control signal; and
- (B-4) by an optical processing unit of the 5G master hub unit, performing wavelength division multiplexing (WDM) on the downlink RoF signal and the digital control signal and transmitting the signals to an optical cable.

10. The next generation in-building relay method of claim 9, further comprising, before (E) the transmitting of the digital optical signal and the analog optical signal,
- (F) by an optical distribution unit of the distributed remote unit, outputting the signal received from the 5G master hub unit to a lower distributed remote unit;
- (G) by the optical distribution unit of the distributed remote unit, performing WDM demultiplexing on the signal received from the 5G master hub unit and outputting a downlink RoF signal and a digital control signal;
- (H) by a digital processing unit of the distributed remote unit, receiving the digital control signal from the optical distribution unit and restoring a reference clock and a transmission timing; and
- (I) by a radio frequency processing unit of the distributed remote unit, converting a downlink RoF signal into a millimeter wave radio frequency signal and transmitting the millimeter wave radio frequency signal.

11. The next generation in-building relay method of claim 9, further comprising:
- (J) by the distributed remote units, converting uplink millimeter wave radio frequency signals received from a 5G terminal into RoF signals and transmitting the RoF signals to the 5G master hub unit;
- (K) by the 5G master hub unit, providing an uplink intermediate frequency signal to the 5G signal providing unit; and
- (L) by the 5G signal providing unit, converting the received uplink intermediate frequency signal into a millimeter wave radio frequency signal and transmitting the millimeter wave radio frequency signal to a 5G base station.

12. The next generation in-building relay method of claim 11, wherein (J) the converting of uplink millimeter wave radio frequency signals comprises:
- (J-1) by a radio frequency processing unit of the distributed remote unit, converting an uplink millimeter wave radio frequency signal received from a 5G terminal into an RoF signal;
- (J-2) by a digital processing unit of the distributed remote unit, transmitting a state information signal; and
- (J-3) by an optical distribution unit of the distributed remote unit, performing WDM on the signal received from the lower distributed remote unit, the uplink RoF signal, and the state information signal and transmitting the signals to the 5G master hub unit.

13. The next generation in-building relay method of claim 11, wherein (K) the providing of an uplink intermediate frequency signal comprises:
- (K-1) by an optical processing unit of the 5G master hub unit, performing WDM demultiplexing on a signal integrally received from the distributed remote unit and transmitting an uplink intermediate frequency signal to an RoF processing unit;
- (K-2) by the optical processing unit of the 5G master hub unit, transmitting a state information signal of the distributed remote unit to a digital processing unit;
- (K-3) by an RoF processing unit of the 5G master hub unit, integrating uplink RoF signals, converting the uplink RoF signals into stream-specific intermediate frequency signals, and transmitting the stream-specific intermediate frequency signals to an intermediate frequency processing unit;
- (K-4) by the intermediate frequency processing unit of the 5G master hub unit, transmitting an uplink intermediate frequency signal to the 5G signal providing unit; and
- (K-5) by a digital processing unit of the 5G master hub unit, receiving a state information signal of the distributed remote unit and performing state monitoring on the distributed remote unit.

\* \* \* \* \*